US007683792B2

(12) United States Patent
Araiza-Boys

(10) Patent No.: US 7,683,792 B2
(45) Date of Patent: Mar. 23, 2010

(54) IN HOME MULTI DISASTER ALARM SYSTEM

(76) Inventor: Susan Araiza-Boys, P.O. Box 1096, Bella Vista, CA (US) 96008

( * ) Notice: Subject to any disclaimer, the term of this patent is extended or adjusted under 35 U.S.C. 154(b) by 283 days.

(21) Appl. No.: 11/655,597

(22) Filed: Jan. 18, 2007

(65) Prior Publication Data

US 2008/0048873 A1 Feb. 28, 2008

Related U.S. Application Data

(60) Provisional application No. 60/761,960, filed on Jan. 24, 2006.

(51) Int. Cl.
*G01W 1/00* (2006.01)

(52) U.S. Cl. ........................ 340/601; 340/905; 340/540; 340/632; 340/539.26; 702/3; 379/37

(58) Field of Classification Search ................. 340/601, 340/905, 540, 632, 539.26, 901, 286.01, 340/286.14, 602, 600, 525, 539.28, 690; 702/2, 3; 379/37; 73/170.16
See application file for complete search history.

(56) References Cited

U.S. PATENT DOCUMENTS

| | | | | |
|---|---|---|---|---|
| 6,278,375 | B1 * | 8/2001 | Hucker | 340/601 |
| 6,351,218 | B1 * | 2/2002 | Smith | 340/601 |
| 7,084,775 | B1 * | 8/2006 | Smith | 340/601 |
| 7,327,271 | B2 * | 2/2008 | Greenstein et al. | 340/601 |
| 7,403,098 | B2 * | 7/2008 | Watkins et al. | 340/425.5 |
| 2005/0024011 | A1 * | 2/2005 | Chen | 320/107 |

* cited by examiner

*Primary Examiner*—Anh V La

(57) ABSTRACT

An alarm unit for providing warnings of multiple types of emergency situations includes a connector for connecting the unit to host electricity, a backup power source, receiver circuitry for receiving a broadcast warning, memory for storing digital alarm files, and a speaker for amplifying an executed alarm file. The receiver circuitry receives one or a combination of early warning system broadcast alerts, emergency band radio alerts, cellular network alerts, or data network alerts.

20 Claims, 3 Drawing Sheets

IN HOME MULTI DISASTER ALARM SYSTEM

CROSS-REFERENCE TO RELATED APPLICATIONS

The present invention claims priority to a U.S. provisional patent application Ser. No. 60/761,960 entitled In-Home Multi-Disaster Alarm System filed on Jan. 24, 2006. The application is included herein at least by reference.

BACKGROUND OF THE INVENTION

1. Field of the Invention

The present invention is in the field of alarm systems for emergencies and pertains particularly to a multipurpose disaster alarm for in-home installation and use.

2. Discussion of the State of the Art

In the field of general alarm systems, there are a wide variety of differing types of alarms. There are security alarms for homes, businesses, and automobiles. There are fire alarms for homes and businesses. For weather related emergencies there are no fixed in-home or in-business alarm systems. Weather alarms are generally fixed in a community like an early warning system for tornados, for example. Sirens are set to blare when the national weather service issues a warning to a general region such as a county. Weather emergencies are typically broadcast to televisions and weather radios that are tuned into local channels or frequencies.

One problem with portable alarm systems for weather is the fact that they may not always be located when severe weather arises due to infrequent use or simple misplacement of such systems like radios for example. Moreover, it is typical of such systems to require fresh batteries after a long time of non-use. Although early warnings may be broadcast to television sets in home, many residents do not hear important broadcasts because many weather related disasters occur late at night or very early in the morning when residents are asleep. Community sirens provide to short of a time span between the warning and the actual emergency. Likewise, many residents do not hear the sirens because they may be sleeping.

Another drawback to alarm systems in general is that they are dedicated only for certain emergencies. For example, a tornado warning and a fire warning are handled by completely different systems. Other disasters like floods, landslides, poisonous clouds, hostage situations, and the like do not have dedicated alarm systems and typically many persons are caught off guard in such disasters.

What is clearly needed in the art is an in-home multi-disaster alarm system that can warn residents of multiple different emergency situations. A system such as this would result in more lives saved during emergency situations.

SUMMARY OF THE INVENTION

According to an embodiment of the present invention, the inventor provides an alarm unit for providing warnings of multiple types of emergency situations. The alarm unit includes, in one embodiment, a connector for connecting the unit to host electricity, a backup power source, receiver circuitry for receiving a broadcast warning, memory for storing digital alarm files, and a speaker for amplifying an executed alarm file.

In a preferred embodiment, the alarm unit is installed in a residence and the connector connects the unit to house electricity. In one embodiment, the receiver circuitry receives one or a combination of early warning system broadcast alerts, emergency band radio alerts, cellular network alerts, or data network alerts. In this embodiment, the data network is the world-wide-web and the alerts are sourced from one or more Web servers.

In one embodiment, the backup power source for the alarm unit is one or more rechargeable batteries. In one embodiment, the emergency situations include any combination of fire, weather, flood, police emergency, or environmental emergency.

In one embodiment, the memory also includes a telephone number or another unique identifier. In a variation of this embodiment, the alarm unit further includes a global positioning satellite device for reporting location of the unit. In another embodiment, the alarm unit further includes a data conversion block for analyzing incoming alert data and converting the data to code for executing a selected alarm files from a pool of alarm files. In a preferred embodiment, the alarm unit further includes a power switch for switching from electricity to battery power in case of interruption of power to the unit.

In the embodiment that includes receipt of environmental emergencies, the environmental emergency is a cloud of gas. In another embodiment, the alarm is further includes one or more sensors for detecting gas levels in a home. In this embodiment, the detected gas is one of carbon monoxide or methane gas.

According to another aspect of the present invention, a warning system for delivering early warnings of impending emergencies to local residents is provided. The system includes an emergency detection source of information, a local emergency warning system alert broadcast system, one or more local relay stations, and one or more fixed multi-disaster alarms distributed to residences.

In one embodiment, the emergency detection source of information is the national weather service organization. In one embodiment, the one or more relay stations include a radio station or a television station, or a combination of those. In one embodiment, the one or more relay stations include a cellular telephone network station, or a Web-based server alert station, or a combination of those.

According to another aspect of the invention, in a multi-disaster alarm unit including receiver circuitry for receiving a broadcast warning; memory for storing digital alarm files; and a speaker for amplifying an executed alarm circuitry a method is provided for processing an alert to sound an alarm. The method includes acts for (a) receiving one or more alerts; (b) associating the one or more alerts to an emergency type; (c) selecting one or more appropriate alarm files, and (d) executing the selected alarm file or files.

In one aspect of the method in act (a), the alert or alerts are received from an early warning system through radio or television, an emergency band radio frequency, a cellular network, or data network. In one aspect in act (b), associating the alert to an alarm type is accomplished by one or a combination of parsing text, voice recognition, or signal identification.

BRIEF DESCRIPTION OF THE DRAWING FIGURES

DETAILED DESCRIPTION

Figure 1:
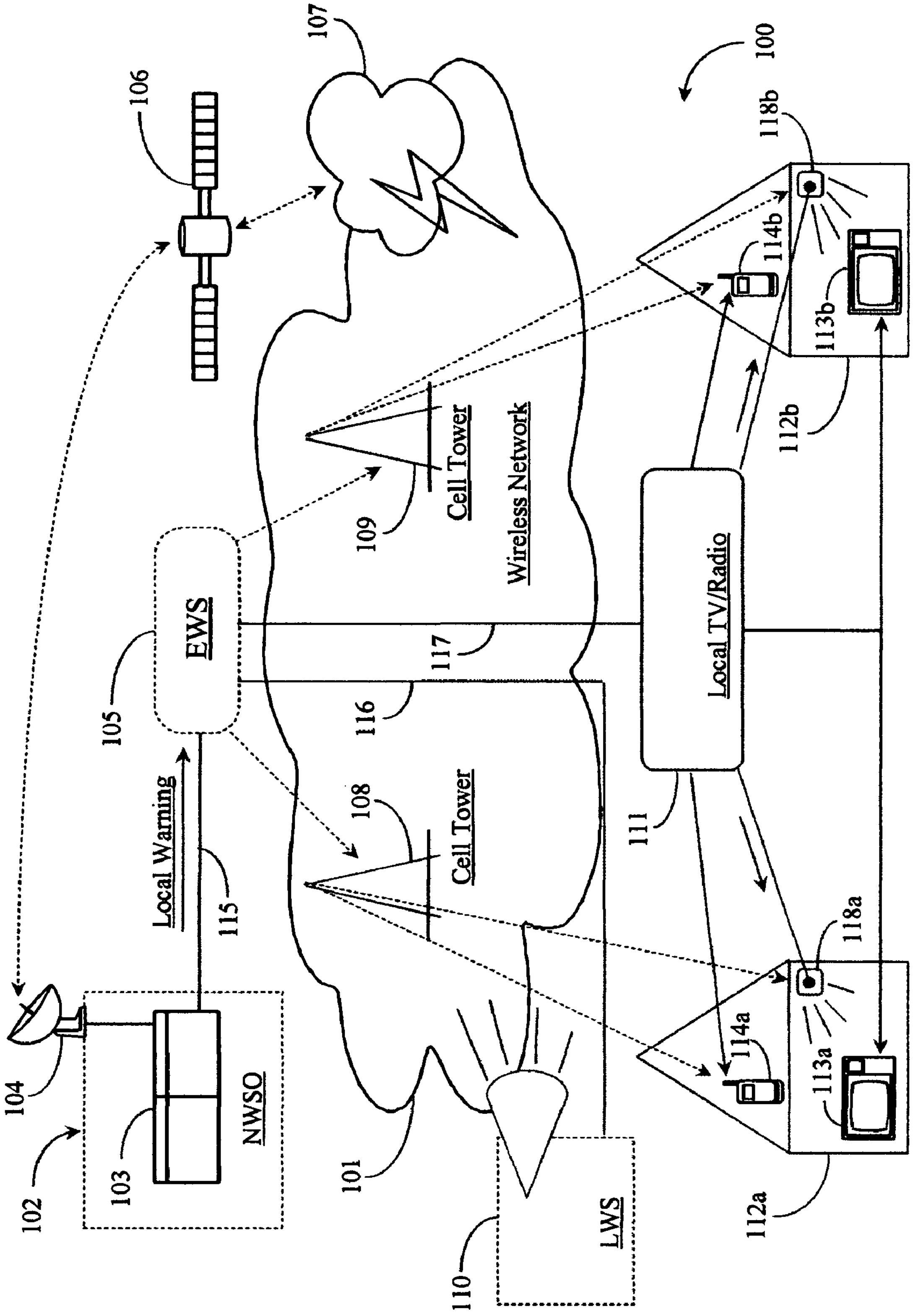
FIG. 1 is an architectural overview of an early warning network for broadcasting disaster alerts to a multi-disaster alarm unit according to an embodiment of the present invention.

FIG. 1 is an architectural overview of an early warning network 100 for broadcasting disaster alerts according to an embodiment of the present invention. Network 100 is adapted to propagate a weather warning, or some other public warning to end devices and systems adapted to receive warnings and to alert people when some disaster is pending for a specific locality. Network 100 includes an early warning system (EWS) 105 adapted to receive information from a disaster monitoring service and to propagate or forward locally pertinent information to local stations for broadcast to end user devices.

In this example, a national weather service office (NWSO) facility 102 is illustrated as an example of an agency responsible for monitoring events that have a potential of causing localized disasters or other potential problem events and then providing emergency data to regional systems that might be affected by such an event. In this case, NWSO 102 monitors weather primarily, but may also provide warning information about flooding and fire. Other entities might be responsible for monitoring other types of emergency situations like terrorist activity or other forms of potentially disastrous emergencies.

In this example, the NWSO 102 is tracking a storm 107 via satellite 106. A receiver 104 provides information to entity 102 for emergency reporting. An information and alert server 103 is illustrated within facility 102 and is adapted to generate periodic reports, recommendations, watches and warnings that may be passed to EWS 105 over a network line 115. EWS is adapted as one of many possible local alert systems that may forward emergency information to appropriate networks for timely forward to localized entities. In this case, NWSO 102 has been tracking dangerous storm 107 and is providing data to EWS 105 over network line 115. Storm 107 may be a tornado, a hurricane, or another emergency deemed serious enough to report. In current art, EWS sends storm watch and warning data to local television and radio stations represented herein as local TV/Radio station 111 over network line 117. Generally speaking, granularity with the EWS may be countywide meaning that when a localized alert is appropriate, it affects the entire county the emergency is detected in, or is moving to. Therefore, if storm 107 were a tornado, each county that would be affected in the tornado path would get broadcast warnings to both television and radio. However; if a warning is broadcast that is specific to one county, all of the other nearby counties may also receive the same alert or warning.

A wireless network 101 is illustrated in this example as one medium through which disaster alerts may be propagated. In this example, local station 111 broadcasts alerts or warnings over wire lines or wireless television to homes 112*a* and 112*b* representing neighborhood residences in the path of storm 107. Televisions 113*a*, within home 112*a* and 113*b*, within home 112*b* are typical television receivers receiving alerts or warnings via cable from station 111. Radios 114*a*, within home 112*a* and 114*b*, within 112*b* are also typical receiving devices of the early warning system or emergency broadcast system. Moreover, radios 114*a* and 114*b* may be cellular telephones capable of receiving early warning broadcasts directly from EWS 105 via wireless network 101 and cell towers 108 and 109.

A local warning siren (LWS) 110 is also connected to EWS 105 via network line 116. LWS 110 is typically a loud municipal siren that, when tripped, provides a very loud audible warning sound that may be heard throughout a local area under distress. LWS 110 may be activated during tornados, hurricanes, bombings, or other immediate disasters requiring people to take cover or to move to shelters.

One with skill in the art of emergency broadcast or alert systems will appreciate that in some cases, the current warning routes to end devices may be vulnerable to the effects of the disaster itself. In other cases, the timing of a disaster such as a tornado for example, may take place late in the evening or very early in the morning when most persons are sleeping. In this case, cellular telephone may be turned off, televisions may be turned off, and radios may be turned off. Depending on the proximity to LWS 110, a resident may not hear a warning while sleeping and therefore may be unprepared for the unfolding emergency. Likewise, if power is out due to the storm, televisions may not work. Cellular phones may also lose connectivity in a storm.

According to an embodiment of the present invention, a multi-disaster alarm (MDA) 118*a* is provided to and installed in home 112*a*. Likewise, an MDA 118*b* is provided to and installed in home 112*b*. MDA 118*a* and 118*b* is the same device and may be referred to as MDA 118. Designation of 118*a* and 118*b* refers only to separate installations in the respective homes.

MDA 118 is adapted to receive early warnings and alerts from EWS 105 and/or from station 111 as they might occur and to trigger a very loud audible alarm that can be easily heard anywhere on the property. In one embodiment, MDA 118 includes a standard fire alarm and smoke detection circuitry and can be used to replace a standard fire alarm. In this embodiment, MDA 118 may further include poisonous gas sensors that are adapted to detect unsafe levels of carbon monoxide or methane gasses in a residence. In this case, MDA 118 can forewarn of fire, unsafe gas levels, hurricane, tornado, flooding, terror attack, or any other local disastrous event after receiving alert or warning signal from station 111 or EWS 105. Moreover, resident zip codes may be used in the determination of EWS or by station 111, whose devices will actually receive warning signals. Furthermore, the alarm sound provided by device 118 may also include the nature of the impending event and instructions of which emergency plan or procedure to follow. For example, if the warning were a fast approaching fire then evacuation would be the plan whereas if a fast approaching tornado were the event, then taking cover or moving to a shelter would be the plan.

MDA 118 may have cellular receiving circuitry provided thereto so that it may receive warning signals via wireless network 101 as illustrated by directional arrows between cell towers 108 and 109 and MDA 118. MDA 118 may also have radio circuitry provided hereto and adapted to receive signals from station 111. In one embodiment, MDA 118 has both cellular and radio receiving capabilities. MDA 118, in a preferred embodiment, uses alternating current or direct current from house wiring to stay powered on and set to receive warnings. MDA 118 has a backup battery source that automatically takes over for the device should the power to the home be cut during a storm or other disaster.

An advantage of device 118 over traditional warning receivers and transmitters is that it is always on and is in a fixed position like a standard fire alarm. In fact, the same device may forewarn all of the potential disasters without interrupting normal smoke detector and in house fire alarm procedures and/or detection of unsafe levels of gasses. Therefore, in a preferred embodiment the device also incorporates the standard fire alarm features and may be used in replacement of the existing fire alarms as an enhanced multi-disaster alarm system.

In current warning systems, messages and, or warning sounds may be locally broadcast to receiving radios and televisions. The problem is that the relevancy of the alert may not apply specifically to the units receiving the broadcast. The system of the present invention enables the local broadcast system to target units (118*a* and 118*b*) that are most affected by a given emergency. A warning may be targeted specifically to a group of units by consulting a location database of those receivers that are installed in a given area affected most by the emergency. As the emergency evolves to affect additional locations, those specific units may be alerted. For example, an alert may go out to units just ahead of a line of severe thunderstorms while units further ahead of the line are not yet alerted. This concept follows the logic that an alarm triggered by MDA 118 is, by location, an immediate threat and therefore most likely to be taken seriously over a television announcement, for example, that is a more generalized alert. Therefore, the system of the invention allows more granularities with respect to targeting those most likely to be harmed in the situation at hand.

Figure 2:
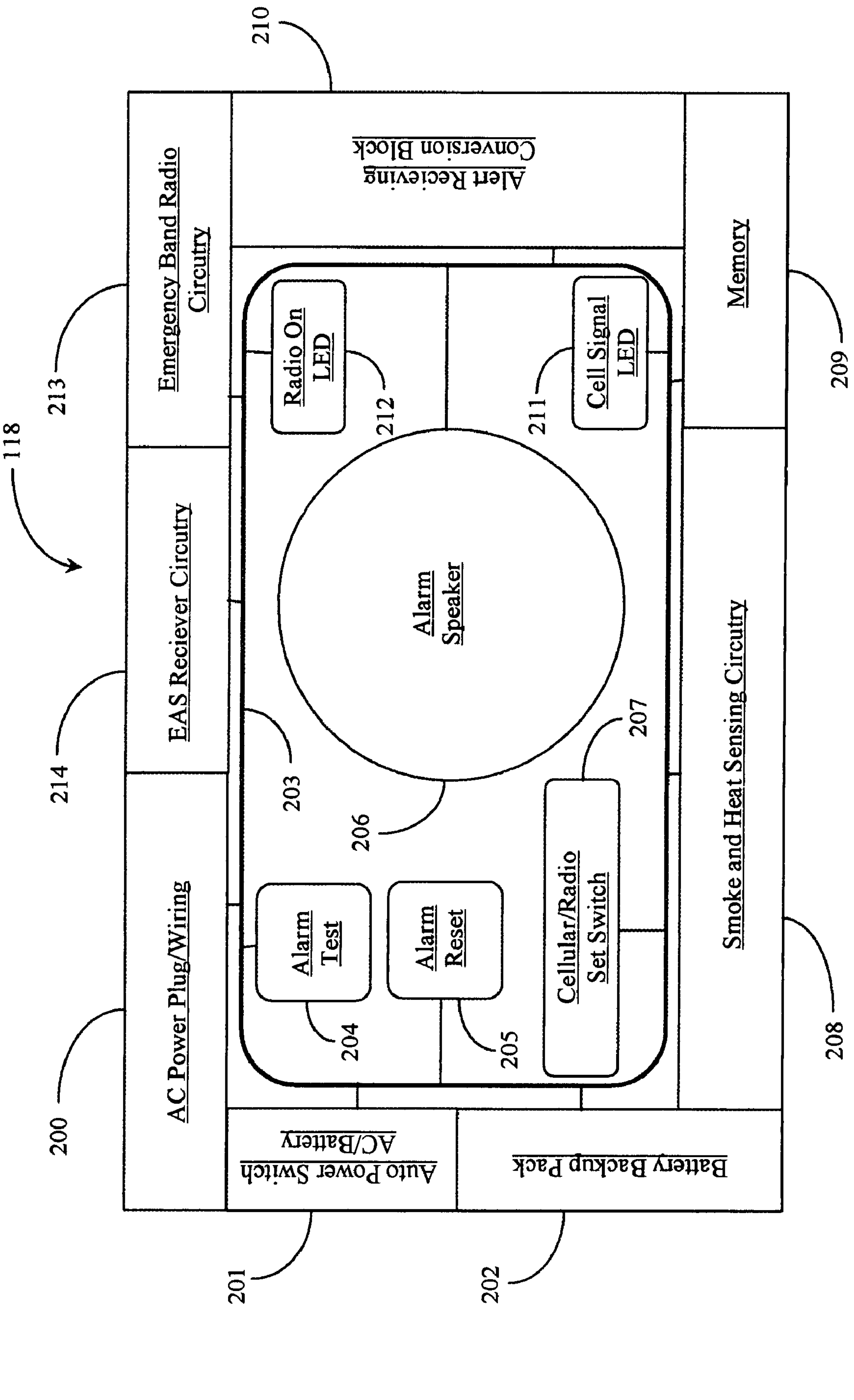
FIG. 2 is a block diagram illustrating components of the multi-disaster alarm unit of FIG. 1 according to an embodiment of the present invention.

FIG. 2 is a block diagram illustrating components of the multi disaster alarm unit 118*a* and 118*b* of FIG. 1 according to an embodiment of the present invention. MDA 118 includes an AC power plug/wiring 200 for incorporation of the device on typical house electrical power. Power may also be DC in some embodiments. Power block 200 is, in one embodiment, the default power source. However, if a power outage occurs MDA 118 may automatically switch to a battery power illustrated herein as battery backup pack 202. Battery backup pack 202 may contain a rechargeable battery cell or multiple batteries sufficient for powering the alarm and other circuitry components of the unit. In one embodiment where battery backup pack is rechargeable, it is always held in a charged state while AC or DC current is powering the system.

An automatic power-switching unit 201 is provided to MDA 118 and is adapted to switch the power source from house electricity to battery in the event of an interruption of power. Likewise, if power is restored, switch 201 may automatically switch back to house electricity from battery backup. Power delivery components 200 and 202 are connected to a logical command and power bus structure 203 to enable power to system components and commands to be sent between components. Switch 201 is also connected to bus 203. Although it is not illustrated in this view, a sensor adapted to detect whether house electricity has been interrupted may be assumed present and may be implemented in AC power block 200.

MDA 118 contains a smoke and heat-sensing block 208 adapted as normal in-home smoke and fire detectors circuitry. As is the case with all in-house fire alarms, block 208 activates when smoke or extreme heat is detected sounding an audible fire alarm, which may be played out through an alarm speaker 206. Although not illustrated herein, sensors for detecting unsafe levels of gasses may also be included without interrupting normal procedures for heat and smoke detection. Therefore, MDA 118 functions in one embodiment as a standard fire alarm. An alarm-testing feature 204 and an alarm reset features 205 are provided for testing alarm function and audibility. External buttons on the housing structure of the unit (not illustrated) may activate features 204 and 205. There may also be an external display screen that displays information to a user such as which alarm features are being tested. MDA 118 is a multi-disaster alarm; therefore, there may be more than one different audible alert or sound for any particular type alarm. For example, an in-home fire alarm may be a loud and constant screech while a local grass fire approaching may induce the same screech broken into a series of separate audible pulses. In this way, a user can instantly determine whether the fire is in the house or approaching the house. Likewise, other alarm sounds and presentations for other alarm types may be implemented. Audible digital files may be stored in and selected from a memory block 209, which is adapted to contain software, files, a software sound player and other required instruction and configuration files. In one embodiment, memory block 209 includes a telephone number or some other unique identifier that may be accessed to provide identification for receiving specific alerts.

In one embodiment, the alarm presentations are digital sound files that are selected and played over speaker 209 by player software installed in memory and executed according to the specific type of alert received. In this embodiment, a user that purchases a new alarm unit may program the unit for the emergencies that are likely to occur in their local area. In another embodiment, one or more mechanical dedicated alarms may be provided that may vary in sound output according to which alert type is received by the unit. For example, a single mechanical alarm and circuitry can produce more than one sound depending on which circuit of the alarm is implemented to sound the alarm.

MDA 118 has an EWS receiving circuitry 214 provided thereto and adapted to receive TV and/or radio alerts or signals from an early warning system. In one embodiment, such warnings or alerts received by EWS block 214 may be parsed by an alert receiving conversion block 210. Block 210 may be a software or firmware adapted to parse radio or TV signals received for warning and alert codes converting those into alarm commands understood by the unit. The actual alert mechanisms received might be audible signals, parseable text, or recognizable voice. Some standard delivery of the warnings, alerts, watches, and so on may be practiced so that MDA units receiving information may quickly utilize the data to trigger the appropriate alarm.

An emergency band radio circuitry block 213 is provided and may be adapted to monitor local emergency band fire, police, and other emergency transmissions. If a local emergency is unfolding, circuitry 213 may detect activity over the channel. Parsing capability may be utilized to decipher codes and other content spoken over a channel. In one embodiment, certain emergency codes or signals understood by MDA 118 are created and propagated over various emergency band channels. Such codes or signals may be data or audible sounds, wavelengths, etc., adapted for the purpose of MDA 118. Block 213 may be used in conjunction with block 210 to ensure that any information received is utilized according to the alarms protocols and rules.

In one embodiment, MDA 118 may be adapted with cellular telephone answering capability. In this embodiment, cellular telephone receiving circuitry (not illustrated) may be provided and adapted to receive commands via a cellular telephone broadcast or a cell call placed to the unit. In the later case, a user might call the unit from a remote location and manually activate an alarm that might be heard by residents. Likewise, warning signals, data, or code might be received from an EWS via cellular network instead of by conventional radio or TV signal. A cellular/radio set switch 207 is illustrated in this example and is adapted to enable a user to set the unit to cellular alert or radio alert for receiving broadcast warnings. Indicator light emitting diodes (LEDs) may be provided to indicate receiving mode of MDA 118. In this example, a cell signal LED 211 is provided and a radio on LED is provided.

In radio mode, MDA 118 may monitor certain radio and/or television channels for emergency information. Likewise, Emergency Band Radio (EBR) circuitry 213 may be monitored simultaneously depending on the circuitry installed. In one embodiment, emergency broadcasts that include audible sounds, signals, and accompanying text may be parsed by MDA 118 and converted to appropriate commands in block 210. In a preferred embodiment, the EWS may be provided with a coding system that can be understood by the unit and that does not interfere with normal radio and television reception. Such a coding system may include variant sounds, beeps, or frequencies that may be equated to various types of emergencies.

In one embodiment, MDA 118 may be adapted with the capability of connecting to a WEB service hosted on a web server connected to a wide area network (WAN). Although not illustrated in this example, circuitry and software may be provided that may be adapted to monitor a special emergency server (URL) for any information that is updated to that server. Therefore, an update that may be an emergency pertinent to an MDA unit may be pushed to the unit over an open and persistent connection to the network such as a digital subscriber line (DSL), broadband cable connection, or satellite.

MDA 118 may be programmable, in one embodiment, to be adapted for alerting residents of different kinds of emergency situations. For example, a unit employed in an area devoid of hurricanes may not be programmed to warn of a hurricane. That is to say, the multi-disaster alarm may be pre-programmed to warn of emergency situations that typically occur in specific regions where the alarm might be installed. Flood alarm would be programmed for units installed in flood prone areas and so on. In a preferred embodiment, each MDA may be mapped for location and uniquely identified so that in any given area only the homes subject to an emergency might receive alerts or warnings sufficient to trigger alarms. For example, units may be located by area codes or other telephone codes that give location information. In one embodiment, the units are pre-programmed for proper zip code. In still another embodiment, GPS might be used to map all of the units deployed so that they might be included in a planned emergency broadcast to a particular locality.

To exemplify a use case where local alarms may be triggered, consider a fast moving grass fire headed in a general direction. As emergency firefighters determine neighborhoods that are in the fires path, warning may be broadcast over the local emergency band to those affected units triggering a fire threat alarm and a stored digital file that informs the residents that evacuation is suggested or ordered. In another case, residents living along a river may have units adapted for flood warnings. In this case, when water monitoring indicates a breech of flood stage for a certain section of the river, those units affected may be alerted via Web site, cell phone, radio, satellite, or emergency band to trigger an impending flood alert or alarm with a following audible or pre-stored voice file indicating what action may be appropriate based on the alert. Obviously if a dam breaks and the flooding is deadly then the most severe flood alert will sound with a voice recording triggered stating that immediate evacuation is ordered. If the flood is less severe, such as one or two feet above flood stage, then the alert might be less serious like a voice file that says stand by to evacuate and tune in to your local emergency network for more information.

There are many types of emergencies for which alerts may be propagated into affected homes and played over the alarm speaker 206 of MDA 118. External fires, tornados, severe thunderstorms, tsunamis, potential mudslides, flooding, hurricanes, and other weather events may be forewarned and alerts received by affected MDA units. Likewise, non-whether related emergencies might also be locally forewarned. Terror attacks, police pursuits, prisoner escapes, eminent plane crashes, and toxic spills or clouds affecting a local or region may be forewarned and alerts received by affected MDA units.

Figure 3:
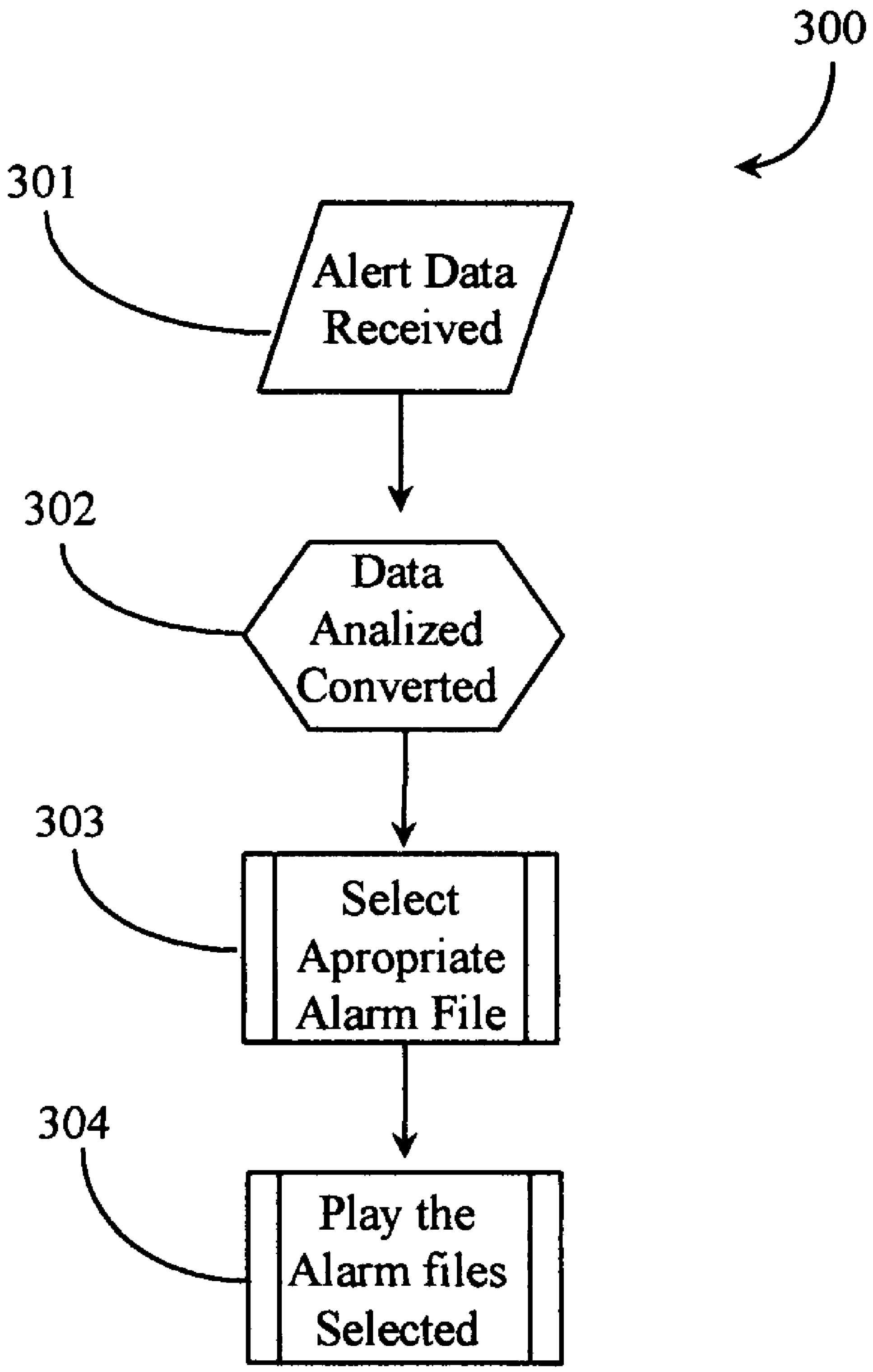
FIG. 3 is a process flow chart illustrating acts for processing a received alert to sound an alarm according to an embodiment of the present invention.

FIG. 3 is a process flow chart illustrating acts 300 for processing a received alert to sound an alarm according to an embodiment of the present invention. In act 301, alert data is received at a multi-disaster alarm unit like MDA 118 (a, b) of FIG. 1. The alert data may be received in the form of a cellular transmission, an emergency band transmission, a radio or television transmission, or a Web-based data transmission.

In act 302, a data received is analyzed and, if necessary converted to a code for executing an alarm file or for sounding a mechanical alarm mechanism. In one aspect, the alarm sound may be a digital file that is played over a speaker system. In one aspect, the alarm may be a mechanical horn, whistle, bell, or other sounding device.

In the case of an alarm file in act 303, the unit selects the appropriate alarm file from a pool of such files based on the unit identifying the emergency type after analyzing the alert data. In act 304, the unit plays the selected alarm file or files. An alarm file may contain the alarm sound played at very high decibels, and any additional sound files that might be associated with that particular alarm type. The additional sound files might include pre-recorded instructions for taking cover, moving to a particular location, evacuation, or other informative messages.

It is noted herein that one in-home alarm unit like MDA 118 (a,b) of FIG. 1, for example, may include both the capability of selecting alarm files and playing them and the capability of sounding one or more mechanical alarms like fire alarms or gas alarms. In one embodiment, playing digital files produces all of the alarm sounds. In another embodiment, there may be one or more mechanical alarm sounding devices that singularly or in combination may produce the different types of alarm sounds associated with different types of emergencies or disasters.

An advantage of having digital alarm files is that they may be provided to the unit through user or service programming so that one unit may be particularly adapted to a specific region by the purchasing entity or by a service provider. Likewise, important procedural information may also be included with the alarm sound files.

One advantage of a multi-disaster alarm unit installed within a residence is that it might alert residents that might be asleep, or might otherwise be unaware of the impending emergency because of a lack of television or access to a portable weather radio. Pre-recorded voice files may be provided and associated with one or more alarm sound files. For example, one sound might be used with fire and another sound might be used with a tornado. Voice files associated with those alarms may be selected to play after the alarm sound is heard so that the user may better understand the nature and threat level of the emergency. For example, in a fire alarm, the alarm may sound and then a voice file may be played that states "A brush fire may be approaching your location from the south!"

In one embodiment, the type of emergency and threat level of the emergency might be incorporated solely into the alarm sound. In one example, a local tornado watch might trigger a short siren whereas a tornado warning might trigger a long or unrelenting siren. A system of locating units might be envisioned wherein units are localized by existing location information like ZIP code or telephone number. Units may also be localized by GPS coordinates and grouped into sectors that correspond with existing county lines or even neighborhood boundaries depending on the localization of any emergencies. For example, a tornado or flood event might be localized to a portion of a county whereas a hostage situation or bomb threat may affect one or more city blocks. There are many possibilities. The benefit of a fixed system that is always on and is capable of forewarning a variety of local emergencies as they might develop surpasses that of traditional broadcast methods using radios or televisions, which may or may not be on or present in the time of the emergency situation. The system of the invention enables more people to be alerted than otherwise might be and targets those most in danger appropriately and accurately.

The system of the present invention may be provided more economically than a television and may be programmed for different types of emergencies that might occur in a given region or area as well as types of emergencies, in which occurrence thereof does not depend on geographic location or particular climate zones or areas. The spirit and scope of the present invention is limited only by the claims that follow.

What is claimed is:

1. An alarm unit for providing warnings of multiple types of emergency situations comprising:

electric circuitry for hardwiring the unit to host electricity;

a backup power source;

receiver circuitry for receiving at least one of a plurality of possible broadcast emergency warnings directly from one of a plurality of different communication networks, each broadcast warning including an indication of at least one type of emergency from a plurality of emergency types;

memory for storing digital alarm files each file associated with each one of the differing emergency types; and a speaker for amplifying executed alarm files;

wherein the broadcast warnings are transmitted over the networks, received by the alarm unit and matched to a stored alarm file and the speaker amplifies the matched alarm file depending upon the type of emergency indicated in the associated broadcast warning received.

2. The alarm unit of claim 1, installed in a residence.

3. The alarm unit of claim 1, wherein the receiver circuitry receives one or a combination of early warning system broadcast emergency alerts directly from the networks and the networks include at least one emergency band radio network, local or cable television network, cellular network, or a data network.

4. The alarm unit of claim 3, wherein the data network is the world-wide-web and the alerts are sourced from one or more Web servers.

5. The alarm unit of claim 1, wherein the backup power source is one or more rechargeable batteries.

6. The alarm unit of claim 1, wherein the emergency types include at least fire, weather, flood, police emergency, or environmental emergency.

7. The alarm unit of claim 1, wherein the memory also includes a telephone number or another unique identifier allowing the receiver circuitry to receive emergency alerts specific to the identifier.

8. The alarm unit of claim 1, further including a global positioning satellite device for reporting location of the unit.

9. The alarm unit of claim 1, further including a data conversion block for analyzing incoming alert data for emergency type and converting the data to code for executing the correct alarm file.

10. The alarm unit of claim 5, further including a power switch for automatically switching from electricity to battery power in case of interruption of power to the unit.

11. The alarm unit of claim 6, wherein the environmental emergency is a cloud of gas.

12. The alarm unit of claim 1, further including a sensor for detecting gas levels in a home.

13. The alarm unit of claim 12, wherein the detected gas is one of carbon monoxide or methane gas.

14. A warning system for delivering early warnings of impending emergencies to local residents comprising:

a local emergency alert broadcast system;

a remote emergency alert broadcast system;

a plurality of local and remote relay stations transmitting alerts on a plurality of differing communication networks; and one or more fixed multi-disaster alarms distributed to residences;

wherein the multi-disaster alarms receive broadcast emergency alerts directly from the emergency alert broadcast systems or via the relay stations, determine an emergency type from the received alert and match the emergency type with one of a plurality of locally stored audible alarms, each stored alarm associated with one of a plurality of emergency types and sound the audible alarm when the emergency is determined pertinent to the residences.

15. The system of claim 14, wherein the remote emergency alert broadcast system is the national weather service organization.

16. The warning system of claim 14, wherein the one or more relay stations include a radio station or a television station, or a combination of those.

17. The warning system of claim 14, wherein the one or more relay stations include a cellular telephone network station, or a Web-based server alert station, or a combination of those.

18. In a multi-disaster alarm unit including receiver circuitry for receiving a broadcast emergency alert; memory for storing digital alarm files; and a speaker for amplifying an executed alarm file, a method for processing an alert to sound an alarm including acts for:

(a) receiving an emergency alert directly from one of a plurality of disparate communication networks;

(b) associating the alert to one of a plurality of emergency types;

(c) associating each emergency type to one of a plurality of locally stored alarm files, at least one alarm file stored for each of the plurality of emergency types, the alarm files having different audio characteristics;

(d) selecting an appropriate alarm file according to the associated emergency type of the received alert; and (e) executing the selected alarm file to play the audio characteristic.

19. The method of claim 18, wherein in act (a), the alert is received from an early warning system through any one of the disparate communication networks, the networks including at least radio, television, an emergency band radio frequency, a cellular network, and a data network.

20. The method of claim 18, wherein in act (b), associating the alert to an emergency type is accomplished by one or a combination of parsing text, voice recognition, or signal identification.

* * * * *